United States Patent Office 3,436,331
Patented Apr. 1, 1969

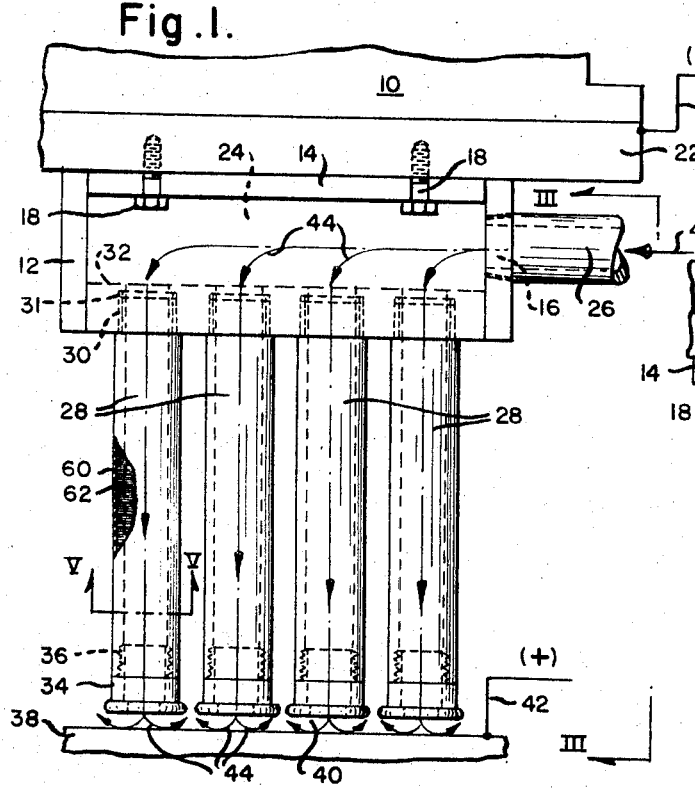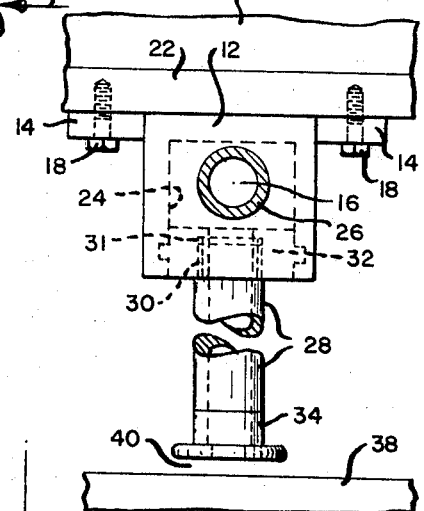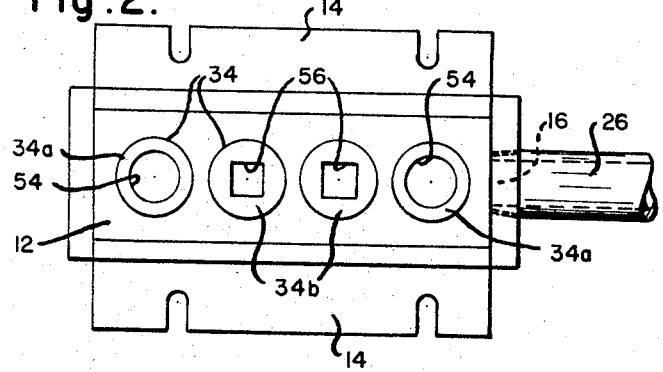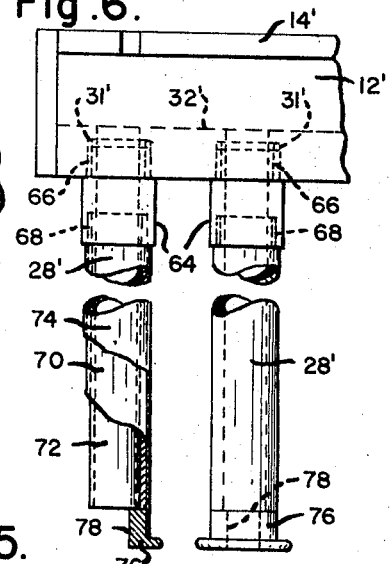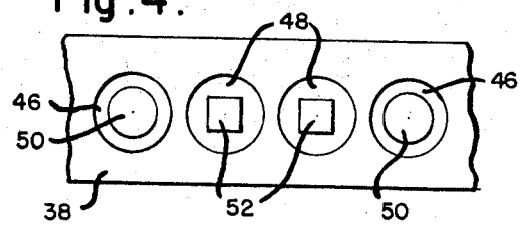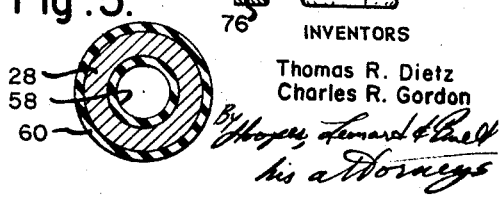

3,436,331
ELECTRO-CHEMICAL MACHINING ELECTRODE
Thomas R. Dietz, Penn Hills, and Charles R. Gordon, Philadelphia, Pa., assignors to Heppenstall Company, a corporation of Pennsylvania
Filed Sept. 3, 1965, Ser. No. 484,795
Int. Cl. C23b 5/74
U.S. Cl. 204—224      5 Claims

ABSTRACT OF THE DISCLOSURE

An electrode arrangement for electro-chemical machining equipment is provided having a manifold member fabricated from an electrically conductive material, a plurality of elongated electrode shanks formed from an electrically conductive material and removably and interchangeably joined at their ends to said manifold member in communication therewith, means for supplying an electrolyte fluid to said manifold, a like plurality of generally tubular electrode tips respectively and mechanically detachably joined to the other ends of said electrode shanks, and an insulating covering for each of the inner and outer surfaces of said tubular electrode shanks, each of said electrode shanks having a plurality of closely spaced circumferential ridges formed substantially along the length thereof to promote adherence of the associated insulated coverings.

---

The present invention relates to electro-chemical or electrolytic machining and more particularly to an electrode arrangement for use in apparatus employing electrolytic machining techniques.

Electro-chemical machining (ECM) is becoming increasingly utilized throughout industry for machining operations where conventional techniques are impossible because of the geometry of the part to be machined or are not competitive due to the hardness of materials or intricacy of the machined part. Electro-chemical machining is particularly useful in connection with such extremely hard materials as tungsten carbide, tungsten, molybdenum, titanium, vanadium and their alloys, nickel, and chrome steels and other hardened steels. In many operations, electro-chemical machining reduces machining time as much as 400 to 500% and thus is preferred over conventional techniques on the basis of material removal rates alone. In other instances, electro-chemical machining techniques are superior to conventional techniques in that a multiplicity of different or similar operations can be carried out simultaneously. This is economically feasible because the electrodes used for such machining operations are relatively inexpensive and therefore can be duplicated economically. Moreover, since the electrodes are relatively inexpensive, electrodes of a given shape can be made for a relatively few production operations which would not justify the cost of adapting a conventional milling machine, for example.

The ECM process provides surface finishes of five micro inches. It can be used to drill intricately shaped holes 150 times their diameters in length with tolerances of plus or minus one mil. The process can generate three dimensional contours where material and geometry preclude conventional machining or grinding or even precision forging. It may even permit the use of steels of outstanding mechanical characteristics, which steels are now laboratory curiosities because they are virtually unmachinable with conventional techniques. Moreover, EMC machining techniques are virtually stress-free as little heat is generated directly in the workpiece.

Electro-chemical machining is particularly advantageous for drilling shapes other than circular such as drilling hexagonal or square holes, for example, or for drilling "curved" holes, such as required through pipe elbows and the like. Moreover, when such holes are drilled no burrs are left on the workpiece as is the case in conventional drilling techniques. ECM, therefore, can be used as a milling cutter, broach, drill, grinding wheel, contour milling machine and the like. Specialized forms of ECM apparatus can even be used as lathe tools for machining rotating work.

In the ECM process an electrode tool is held in proximity to the workpiece being machined and an electrolyte is flowed through the gap between the electrode tool and the workpiece. Negative and positive potentials are applied to the electrode and workpiece respectively. In the case of a copper electrode and a steel workpiece, a suitable electrolyte is ordinary salt (NaCl) dissolved in water with a concentration of between two and two and one-half pounds per gallon. The electrolyte can then be contained in a tank into which the workpiece and electrode tool are immersed, and a suitable high-pressure pump and filtering system can be coupled to the tank to circulate the electrolyte through the aforementioned gap under pressure. A flow rate is selected such that the material removed or deplated from the workpiece, which is a reverse of the normal electroplating process, is carried from the gap without substantial redeposition on the tool or negative electrode. When using the pressure tank arrangement for the electrolyte, a flow rate of about 0.25 g.p.m. per 100 amps of de-plating current can be utilized as a rule of thumb.

Alternatively, the aforementioned electrolyte can be circulated in accordance with the invention through one or more tubular electrodes associated with the electrode tool, under pressure as the normal working gap between the tool and the workpiece seldom exceeds 30 mils. In this latter arrangement, the flow rate of the electrolyte can be substantially reduced.

In the electro-chemical machining process, usually very high current to voltage ratios are employed, with the direct currents varying between 100 and 20,000 amperes and the voltage between two and ten volts. Variation of voltage appears to have little effect upon material removal rates and surface finishes but must be adequate to overcome the electrolytic "cell voltage" of about ⅓ volt plus the overpotentials necessary to overcome workpiece metal pasivity, polarization and electrolyte films. Material removal rates also appear to be independent of workpiece hardness as long as it is electrically conductive. However, material removal rate is directly proportional to current flow while the heat generated in the electrolyte is proportional to the square of the current. Therefore, the optimum operating current usually is dependent upon the economics of heat removal. The material removed from the workpiece frequently appears in the electrolyte as gelatinous precipitates which do not bear a direct influence upon material removal or surface finish. However, the precipitates desirably are removed by the aforementioned filtering system since they may lodge in the relatively narrow gap between the tool and workpiece causing short circuits and tool and workpiece damage.

In most ECM operations, since the machining operations are female in nature, the electrode tool must be insulated throughout its length, save for its cutting tip, to prevent erosion of the walls of the cavity being formed in the workpiece as the electrode passes therethrough. In accordance with the present invention, a novel arrangement for insulating such electrodes is disclosed herein. In the case of the tubular electrodes of the invention, of course, such insulation must be employed on the inner and outer peripheries of the electrode.

In prior electrodes, however, when the tip of the electrode became unduly worn, the entire electrode had to be discarded, together with its expensive insulating covering. This difficulty is increased with the use of tubular electrodes, since two such coverings are involved. In accordance with the present invention, an electrode of novel construction is provided with a removable tip such that the electrode can be coated either with replaceable conventional insulation or with the insulative coatings of the invention and thus can be used indefinitely with only the tip thereof being replaced from time to time. In other arrangements of the invention, the removable electrode tip can be shaped to retain the conventional insulating sleeves upon the electrode shank and means are associated with an electrode manifold of the invention for accommodating electrode shanks of varying sizes. It is contemplated that the removable tip of the electrodes can be supplied with various geometric or irregular shapes for replaceable useage on the electrode shanks. Finally, means are provided by the invention for circulating an electrolyte through a plurality of electrode shank tips utilized simultaneously in accordance with the invention.

The present invention will be described in connection with the simultaneous removal of a plurality of test cores from a test blank or coupon through use of the electrochemical machining process. It will be appreciated that the electro-chemical machining electrode of the invention is not limited thereto, however, but can be used in any of the drilling or machining operations mentioned above.

These and other objects, features, and advantages of the invention together with structural details thereof will be elaborated upon during the forthcoming description of exemplary forms of the invention, when taken in conjunction with the accompanying drawings wherein:

FIGURE 1 is a front elevational view of one form of multiple electrode arrangement for use with electro-chemical machining apparatus and arranged in accordance with the invention;

FIGURE 2 is a bottom plan view of the electrode arrangement of FIGURE 1;

FIGURE 3 is a side elevational view, partially sectioned, of the electrode arrangement of FIGURE 1 and taken along reference line III—III thereof;

FIGURE 4 is a top plan view of the workpiece illustrated in FIGURES 1 and 3 of the drawings;

FIGURE 5 is a cross sectional view of one of the electrodes of FIGURE 1 and taken along reference line V—V thereof; and FIGURE 6 is a partial front elevational view of another form of electrode arrangement in accordance with the invention, with parts being broken away to describe the invention more clearly.

Referring now to FIGURES 1 to 5 of the drawings, the exemplary form of the invention shown therein comprises a ramhead 10 of a known form of electro-chemical machining apparatus, which ramhead is partially shown in FIGURE 1. A manifold box 12 having a pair of mounting flanges 14 as better shown in FIGURES 2 and 3 of the drawings and an electrolyte inlet opening 16 is bolted to the ramhead 10 by means of mounting bolts 18. In accordance with established electro-chemical machining techniques, negative potential is applied to the ramhead conductor 20 and to minimize electrical resistance thereof the ramhead 10 is provided with a copper facing plate 22 to which the manifold box 12 is secured as aforesaid. For this reason, the manifold box 12 likewise is desirably fabricated from copper. The manifold box inlet 16 communicates with an interior flow distributing chamber 24 within the box 12, and an inlet conduit 26 is threadedly secured to the inlet opening 16 in communication with the chamber 24.

A plurality of electrode shanks 28 of an elongated hollow cylindrical construction, in this example, are threadedly secured to the manifold box 12 by means of their upper threaded ends 30 and suitably tapped apertures 31 in the bottom portions 32 of the manifold box. Each of the electrode shanks 28, with four being employed in this arrangement of the invention, terminate in a removable electrode tip 34 which is threadedly secured to its associated electrode shank 28 as denoted by reference character 36. As better shown in FIGURE 2 of the drawings, the electrode tips 34 can be provided with any desirably configuration and for purposes of illustration the two endmost tips 34a are provided with circular configurations while the central tips 34b are afforded a circular outer configuration and a square inner periphery.

As better shown in FIGURES 1 and 3, the electrode tips 34 are supported in close proximity to a workpiece denoted generally by reference character 38 to form a deplating gap 40 therebetween of between 5 and 30 mils in width.

As drilling commences, material is deplated from the workpiece 38, to which a positive potential is applied through conductor 42, and the flow of electrolyte through the inlet conduit 26, downwardly through the tubular electrode shanks 28, and outwardly through the deplating gap 40, as denoted by flow arrows 44 prevents the deplated material from being replated upon the uninsulated electrode tips 34. As material is removed from the workpiece 38, the ramhead 10 is moved downwardly as viewed in FIGURE 1, toward and through the workpiece 38 to maintain the aforementioned gap between the bottom ends of the electrode tips 34 and the bottom surfaces of the cavities 46 and 48 being formed in the workpiece 38, as better shown in FIGURE 4.

The cavities 46 and 48, which are annular in this example of the invention, exceed the inner and outer dimensions of the electrode tips 34 by the width of the aforementioned gap and thus provide flow passages for the electrolyte between the walls of the cavity and the electrode tips. The shanks 28 of the electrodes are of sufficient length that the tips can completely drill through the workpiece 38 to remove test cores 50 and 52 therefrom. The test cores 50 will correspond in cross sectional configuration to the openings 54 in the electrode tips 34a, while the cores 52 removed from the workpiece 38 will correspond in cross section to the inner peripheries 56 of the electrode tips 34b.

The cores 50 and 52 thus machined from the workpiece or test blank 38 are then removed to other locations for testing purposes, for example tensile, fatigue, Charpy-Izod tests. Since the heat generated in the deplating or ECM process is removed by electrolyte flow and since thre is no mechanical contact between the ECM electrodes 28–34, the cores 50 and 52 removed from the workpiece are completely illustrative of the internal condition of the test blank since no stresses have been superimposed there is no mechanical contact between the ECM electrodes reliably made at any point along the length of the cores 50 or 54 to show the variation of metallurgical and mechanical characteristics throughout the thickness of the test blank 38.

In order to prevent replating of the removed material upon the electrode shanks 28, the inner and outer surfaces of the tubular shanks desirably are coated with a suitable insulating material, inasmuch as the electrolyte flow is not sufficiently rapid to prevent all the plating of the material. The insulation also confines the electrolytic action to the tips 34 of the electrodes 28–34, so that the walls of the cavities are not further eroded as the electrodes pass therethrough. As better shown in FIGURE 5, the inner and outer surfaces of each tubular electrodes shank 28 are covered with insulating layers 58 and 60 respectively.

In accordance with one arrangement of the invention, the coverings 58 and 60 are formed by dipping the electrode shanks 28 into a liquid bath of epoxy resin, for example Anocoat #6005, and baking the shank with the coatings thereon for 30 minutes and 60 minutes at a temperature of 180° F. and 390° F. respectively. Desirably, the coating of the electrode shanks 28 is accomplished before threading the end portions 30 and 36 thereof so that no coating remains deposited on these portions. To promote adhesion of the coatings 58 the outer and inner shank surfaces can be roughened, by the use of a very finely pitched thread 62 or the like as shown on the outer surface of each shank 28. The threads 62 in effect form a plurality of circumferential ridges along the length of each shank 28 to increase the adhesive area of the associated coatings. Referring now to FIGURE 6 of the drawings, another form of insulated electrode arrangement in accord with the invention is illustrated. In the latter arrangement, similar reference characters with primed accents are employed to denote similar parts. In the latter arrangement of the invention, a plurality of electro shank adaptors 64 with threaded upper ends 66 threadedly engage the apertures 31' of the manifold box 12'. The lower ends of the adaptors 64 are interiorly threaded at 68 to accommodate electrode shanks 70 of smaller size than that of the electrode shanks 28 (FIGURES 1 to 5). Each of the electrode shanks 70 is insulated by replaceable insulating sleeves 72 and 74 which are closely fitted upon the inner and outer peripheries of the electrode shanks 70.

The insulating sleeves 72 and 74 can be fabricated from a suitable electrically insulating ceramic material, such as fused alumina, and are retained upon the electrode shanks 70 by abutment at their lower ends with an electrode tip 76 whose inner and outer diameters are made appropriately smaller and larger respectively than those of the electrode shank 70 for this purpose. The inner peripheries 78 of the electrode tips 76 can otherwise be shaped as set forth previously in connection with the electrode tips 34 of FIGURES 1 to 5 or can be formed with some other desired configurations. Although the outer peripheries of the electrode shanks 28 and 70 and the electrode tips 34 and 76 have been shown as circular, it will be understood that some other regular or irregular contour can be employed.

From the foregoing, it will be apparent that novel and efficient forms of electrode arrangements have been disclosed herein for use with electro-chemical machining equipment. The descriptive and illustrative materials employed herein have been presented for purposes of exemplifying the invention and not in limitation thereof. Therefore, numerous modifications of the invention will occur to those skilled in the art without departing from the spirit and scope of the invention. Moreover, it is to be understood that certain features of the invention can be advantageously employed without a corresponding use of other features and within the scope of the following claims.

We claim:

1. An electrode arrangement for electro-chemical machining equipment and the like, said arrangement comprising a manifold member fabricated from an electrically conductive material, a plurality of elongated electrode shanks formed from an electrically conductive material and removably and interchangeably joined at their ends to said manifold member in communication therewith, means for supplying an electrolyte fluid to said manifold, a like plurality of electrode tips respectively and mechanically detachably joined to the other ends of said electrode shanks, and an insulating sleeve for each of the outer surfaces of said electrode shanks, said insulated sleeves abutting the electrode tips and retained in place on the shanks by said tips.

2. An electrode arrangement for electro-chemical machining equipment and the like, said arrangement comprising a conductive manifold member, means for supplying a quantity of fluid electrolyte to said member, a plurality of generally tubular electrode shanks removably and interchangeably secured to said manifold member in fluid communication therewith, first and second insulating sleeves closely fitted on the inner and outer peripheries of each of said electrode shanks, and a like plurality of electrode tips respectively and mechanically detachably secured to said electrode shanks and having portions abutting the adjacent ends of said insulating sleeve to retain the latter on said shanks.

3. An electrode arrangement for electro-chemical machining equipment and the like, said arrangement comprising a conductive manifold member, means for supplying an electrolyte fluid to said manfold member, a plurality of conductive generally tubular adaptors threadedly secured to said manifold member in communication therewith, a like plurality of elongated generally tubular electrode shanks respectively and threadedly secured to said adaptors in communication therewith, and a like plurality of electrode tips respectively and threadedly secured to said electrode shanks, each of said electrode shanks having an inner and an outer insulating sleeve closely and removably fitted thereon, and each of said electrode tips having abutting portions engaging respectively the associated ends of said sleeves to retain said sleeves on said electrode shanks.

4. An electrode for electro-chemical machining equipment and the like, said electrode comprising a generally tubular conductive shank, first and second insulating sleeves respectively and closely fitted on the inner and outer peripheries of said shank, and an electrode tip detachably secured to said shank and having portions abutting the adjacent ends of said insulating sleeves to retain the latter on said shank.

5. An electrode for electro-chemical machining equipment and the like, said electrode comprising a generally tubular conductive shank, epoxy resin sleeves closely fitted on the inner and outer peripheries of said shank, and an electrode tip detachably secured to one end of said shank, said tip abutting the adjacent ends of said sleeves to retain the sleeves on said shank and to prevent erosion of said shank.

References Cited

UNITED STATES PATENTS

| 3,058,895 | 10/1962 | Williams | 204—224 XR |
| 3,268,434 | 8/1966 | Weingartner | 204—224 |
| 3,276,988 | 10/1966 | Williams | 204—224 |
| 3,285,844 | 11/1966 | Hallsworth et al. | 204—224 XR |
| 3,288,698 | 11/1966 | Bruns | 204—284 XR |
| 3,309,303 | 3/1967 | Bender et al. | 204—224 |

JOHN H. MACK, Primary Examiner.

D. R. VALENTINE, Assistant Examiner.

U.S. Cl. X.R.

204—143, 284, 290

UNITED STATES PATENT OFFICE
CERTIFICATE OF CORRECTION

Patent No. 3,436,331  
April 1, 1969

Thomas R. Dietz et al.

It is certified that error appears in the above identified patent and that said Letters Patent are hereby corrected as shown below:

Column 1, line 68, "EMC" should read -- ECM --. Column 3, line 61, before "conductor" insert -- through --; line 74, "portions" should read -- portion --. Column 4, line 47, "thre'" should read -- there --; line 51, "there is no mechanical contact between the ECM elec-" should read -- thereon by the machining process. Therefore, tests can be --; line 65, "electrodes" should read -- electrode --. Column 6, line 19, "manfold" should read -- manifold --.

Signed and sealed this 14th day of April 1970.

(SEAL)

Attest:

Edward M. Fletcher, Jr.  
Attesting Officer

WILLIAM E. SCHUYLER, JR.  
Commissioner of Patents